United States Patent [19]

Raychaudhuri

[11] Patent Number: 4,745,599
[45] Date of Patent: May 17, 1988

[54] RANDOM ACCESS COMMUNICATION SYSTEM WITH CONTENTION SCHEDULING OF SUBPACKETIZED DATA TRANSMISSIONS AND SCHEDULED RETRANSMISSION OF UNSUCCESSFUL SUBPACKETS

[75] Inventor: Dipankar Raychaudhuri, S. Brunswick Township, Middlesex County, N.J.

[73] Assignee: General Electric Company, Schenectady, N.Y.

[21] Appl. No.: 424

[22] Filed: Jan. 5, 1987

[51] Int. Cl.$^4$ ............................................. H04J 3/24
[52] U.S. Cl. ......................................... 370/93; 370/94
[58] Field of Search ................. 370/60, 94, 110.1, 85, 370/104, 93; 340/825.5

[56] References Cited

U.S. PATENT DOCUMENTS

| | | | |
|---|---|---|---|
| 4,063,220 | 12/1977 | Metcalfe et al. | 340/147 LP |
| 4,210,780 | 7/1980 | Hopkins et al. | 370/80 |
| 4,234,952 | 11/1980 | Gable et al. | 370/94 |
| 4,320,500 | 3/1982 | Barberis et al. | 370/60 |
| 4,332,027 | 5/1982 | Malcolm et al. | 370/94 |
| 4,337,465 | 6/1982 | Spracklen et al. | 340/825.03 |
| 4,476,467 | 10/1984 | Terwilliger et al. | 340/825.5 |
| 4,514,843 | 4/1985 | Albanese | 370/93 |
| 4,542,502 | 9/1985 | Levinson et al. | 370/88 |
| 4,543,574 | 9/1985 | Takagi et al. | 340/825.5 |
| 4,550,397 | 10/1985 | Turner et al. | 370/60 |
| 4,560,984 | 12/1985 | Scholl | 340/825.5 |
| 4,604,685 | 8/1986 | Brown et al. | 364/200 |
| 4,688,213 | 8/1987 | Raychaudhuri | 370/93 |

OTHER PUBLICATIONS

Patent application Ser. No. 610,007 filed May 14, 1984, in the name of Raychaudhuri, now abandoned, and its continuation Ser. No. 873,446 filed Jun. 6, 1986.
Patent application Ser. No. 802,999 filed Nov. 29, 1985, in the name of Raychaudhuri.
Application Ser. No. 905,506, filed Sep. 10, 1986, in the name of Raychaudhuri.

*Primary Examiner*—Douglas W. Olms
*Assistant Examiner*—Frank M. Scutch, III
*Attorney, Agent, or Firm*—Joseph S. Tripoli; Henry I. Steckler; Fred Jacob

[57] ABSTRACT

A random access communication system forms messages to be transmitted into subpackets of fixed duration. A message packet includes two or more subpackets. Each subpacket includes information relating to the source transmitter-receiver and the number of subpackets in the message. The subpackets of the message packet are transmitted contiguously over the transmission path in a contention mode. Some subpackets are successfully received and some are lost due to collisions. After a period of asynchronous contention operation, a predetermined number of subpackets are successfully received, and the system switches to a short-term synchronous, scheduled operating mode. In the scheduled operating mode, those transmitter-receivers which were the sources of message packets including some successful and some unsuccessful subpackets retransmit the data from the unsuccessful subpackets, ordering themselves in accordance with the order of receipt of successful subpackets. The system capacity is high, average delay is short and continuous global synchronization is not required.

11 Claims, 7 Drawing Sheets

TRANSMIT CONTROL

RANDOM ACCESS COMMUNICATION SYSTEM WITH CONTENTION SCHEDULING OF SUBPACKETIZED DATA TRANSMISSIONS AND SCHEDULED RETRANSMISSION OF UNSUCCESSFUL SUBPACKETS

FIELD OF THE INVENTION

This invention relates to random access communication systems in which data transmissions are accomplished by sequences of subpackets which contend on an asynchronous random access basis for transmission and which, when partially successfully transmitted, result in scheduled retransmission of unsuccessful data subpackets.

BACKGROUND OF THE INVENTION

Many modern communication systems involve a number of geographically dispersed transmitter-receivers which communicate with each other by way of a high data rate transmission channel. The transmission channel may be a broadcast channel, a fiber optic cable or an electromagnetic transmission line, or it may include transmissions among a number of Earth station transmitter-receivers by way of the transponder of an Earth satellite. Economic considerations suggest that when the capital cost of a communications system is large, the capacity (the maximum throughput) of the system be as large as possible. Capacity is at a maximum, or 100%, when a single transmitter operates continuously and uses the communication channel or transmission path to address one or more receivers. When more than one transmitter must use the transmission path, a problem arises relating to scheduling the transmitters for maximum system capacity. If the transmitters which are to share the transmission path are physically near each other, a scheduler may be connected to each transmitter to uniquely establish a transmission time for each transmitter depending upon the amount of data to be transmitted, its importance or like considerations. When the geographic distance between the transmitters is large, and there is therefore a time delay between the signals leaving the scheduler and the time at which they arrive at the transmitters to be controlled, the scheduler may not be efficient in adapting to the changing conditions at each transmitter.

One approach to multi-access on such high propagation delay channels is to partition the channel time in a fixed, predetermined manner. Such systems are known as time division multiple access (TDMA) systems. They are efficient when the user population includes a few users having high duty cycles. Many modern systems provide communication among interactive data terminals, which operate in low duty cycle burst modes. Time division multiple access is not efficient in this context, because the burst of data may not fill the allotted time, the unused portion of which is therefore wasted.

In response to the increasing need for communication over transmission paths having a time delay, schemes have evolved in which each transmitter-receiver (Tx/Rx) monitors the signal on the transmission path to determine whether the transmission path is active or idle, for scheduling transmissions during idle intervals. Because of the path delays, two or more transmitter-receivers might begin transmission at nearly the same time, unaware of each other's transmission. As a result, the transmission path would carry two or more signals simultaneously, causing a mutual interference known as a collision. Such collisions ordinarily make it impossible to correctly receive and decode the information carried by the signals, and the transmitted information is therefore effectively destroyed. When the information is destroyed by a collision, it must be retransmitted. Many procedures or protocols have been devised for monitoring the transmission path to establish the presence or absence of a carrier and for scheduling transmissions and retransmissions in order to maximize capacity. Carrier sensing systems of this general sort have capacities in excess of 80%. U.S. Pat. No. 4,234,952 issued Nov. 18, 1980, to Gable, for example, stops or truncates the transmission of an information packet when interference is noted during transmission of that packet. Once a transmission has been in progress for the end-to-end propagation time of the transmission path, all transmitters other than the one transmitting are inhibited and the transmission is completed without collision.

The problems associated with TDMA and carrier sensing systems have led to contention protocols intended to more efficiently utilize a high propagation delay transmission path for low duty cycle communications among a large number of users. In general, contention systems allow any transmitter-receiver to transmit a message at will. In the event that two transmitter-receivers transmit at overlapping times, a collision occurs, as in the case of the carrier sensing systems with long propagation delays. Each transmitter-receiver must determine the existence of such collisions and respond by retransmitting the information. The ALOHA contention protocol is an asynchronous or unslotted system in which a plurality of remote stations are connected to a central station by a single transmission path. The various remote stations transmit complete packets of data over the transmission path. Collisions are resolved by retransmission, at random times after the collision, of the data lost due to collision. The ALOHA system has a capacity of approximately 18 percent for low data rate transmissions. Thus, it has a relatively low maximum throughput due to the inefficiency associated with wasting the time of two transmission packets in the event of a slight overlap of packet transmission times. However, ALOHA has a relatively short average transmission delay, because a transmission which does not collide is transmitted immediately and received after only the path length delay.

Slotted or synchronous ALOHA is an improvement over simple ALOHA in which all transmissions occur in fixed non-overlapping time slots. By thus slotting or synchronizing transmissions, the vulnerable time for packet collision is reduced from a duration equal to two packet intervals to one packet interval, and the capacity therefore increases to 37%. The slotting requirement, however, increases the cost and complexity of the system. Also, both slotted and unslotted ALOHA are subject to further inefficiencies resulting from collisions among retransmitted packets.

The Selective Reject ALOHA technique is described by a Raychaudhuri article which appeared in the IEEE Transactions on Communication, Feb. 1984, pp. 148-154. This technique fills the practical requirement for a channel sharing technique which handles messages of variable length efficiently, without requiring time synchronization among stations. This system is similar to ALOHA in that it involves contention message transmission, with subpacketization of the messages, combined with a Selective Reject retransmission protocol. In Selective Reject retransmission, only the collided subpackets as retransmitted, and the retransmission occurs at a random time following the collision. Maximum throughput or capacity in the vicinity of 0.3 can be achieved with Selective Reject ALOHA, regardless of message length distribution.

A time slotted contention access protocol in which new transmissions are prevented from interfering with retransmissions provides up to approximately 49% capacity. This system is the Capetanakis tree algorithm, described in IEEE Transactions on Information Theory, September 1979, pp. 505–515, later refined by J. L. Massey and by R. G. Gallager. Tree algorithms achieve moderately high capacity on short propagation delay systems, but are not well suited to long propagation delay systems because the outcome of a slot transmission must be known before transmission on the next slot can begin.

A slotted contention access system entitled "Announced Retransmission Random Access (ARRA)" is described in U.S. patent application Ser. No. 873,446, filed June 6, 1986, in the name of Raychaudhuri, which is a continuation of Ser. No. 610,007 filed May 14, 1984 (now abandoned). The ARRA system pre-establishes the time at which a retransmission will occur in the event of a collision in a particular packet, and transmits this information together with the original packet in a manner which survives the collision. Thus, all transmitter-receivers are advised of the time at which retransmission will occur, and are programmed to inhibit transmission during the retransmission period. The ARRA system provides a capacity of approximately 53% for the less complex embodiments and as high as 60% in the more complex embodiments.

For some applications, the slotting or synchronization requirement of slotted ALOHA, Tree Algorithm Random Access or ARRA may be undesirable. An asynchronous contention access system entitled "Asynchronous Random Access Comnunication System With Collision Resolution Based On Time Of Arrival" is described in U.S. patent application Ser. No. 802,999 filed Nov. 29, 1985, in the name of Raychaudhuri. In this system, all data packets as transmitted have a fixed duration. When a collision occurs, at least that transmitter-receiver whose own packet was first among those colliding and that transmitter-receiver whose own packet was last among those colliding identify their own transmissions as being first and last, respectively, and can retransmit their packets of data in a scheduled manner which avoids further collisions. Other embodiments extend this concept to scheduled retransmission of those packets which were first, second, penultimate and last among those colliding. This asynchronous system achieves a capacity of approximately 0.41 in the simpler embodiments and approximately 0.51 in the more complex embodiments.

A random access communication system with scheduled data transmissions and asynchronous contention scheduling is described in U.S. patent application Ser. No. 905,506 filed Sept. 10, 1986, in the name of Raychaudhuri. In this system, relatively short fixed-duration reservation request packets are transmitted on an asynchronous, contention basis, which transmissions, if successfully received, result in scheduled transmission of random-length message packets. This system has a capacity of approximately 0.65 when the duration $(T_R)$ of the reservation request packet is about 1/10 the duration $(T_M)$ the associated message packet. For $T_R/T_M=0.05$, capacity in 0.78, and for $T_R/T_M=0.025$, capacity is 0.88. However, since a reservation request packet must be transmitted and successfully received, and only then is the message packet transmitted, there is a mandatory minimum delay, even for short messages during periods in which the system is lightly loaded.

A simple random-access burst communications system which can handle variable length messages with low average delay and with high capacity is desired.

SUMMARY OF THE INVENTION

A system, apparatus and method for random access contention communication of burst signals by way of a transmission path among a plurality of transmitter-receivers includes means for accepting information to be transmitted at each transmitter-receiver and for forming the information into one or more information subpackets of predetermined duration. Means are provided at each transmitter-receiver for forming the subpackets into a contiguous stream and for adding header information to each subpacket indicating the number of subpackets in the entire message, and also indicating the identities of the source and destination transmitter-receivers. In a first mode of operation, the contiguous stream of subpackets is transmitted at a random time to other transmitter-receivers of the system by way of the transmission path. The number of successfully received subpackets is counted by all transmitter-receivers of the system, and the first mode of operation is terminated simultaneously by all transmitter-receivers of the system upon successful reception of a predetermined number of subpackets. Upon the ending of the first mode of operation, a second mode of operation begins during which the data from those subpackets which were not received during the first mode of operation is retransmitted in the form of new subpackets, and during which initiation of new transmissions which were not previously transmitted is inhibited. The inhibition guarantees that the retransmissions are received without collision.

DESCRIPTION OF THE DRAWING

FIGS. 5 and 6 are simplified flow charts representing details of the logic of FIG. 4a.

DETAILED DESCRIPTION OF THE INVENTION

Figure 1:
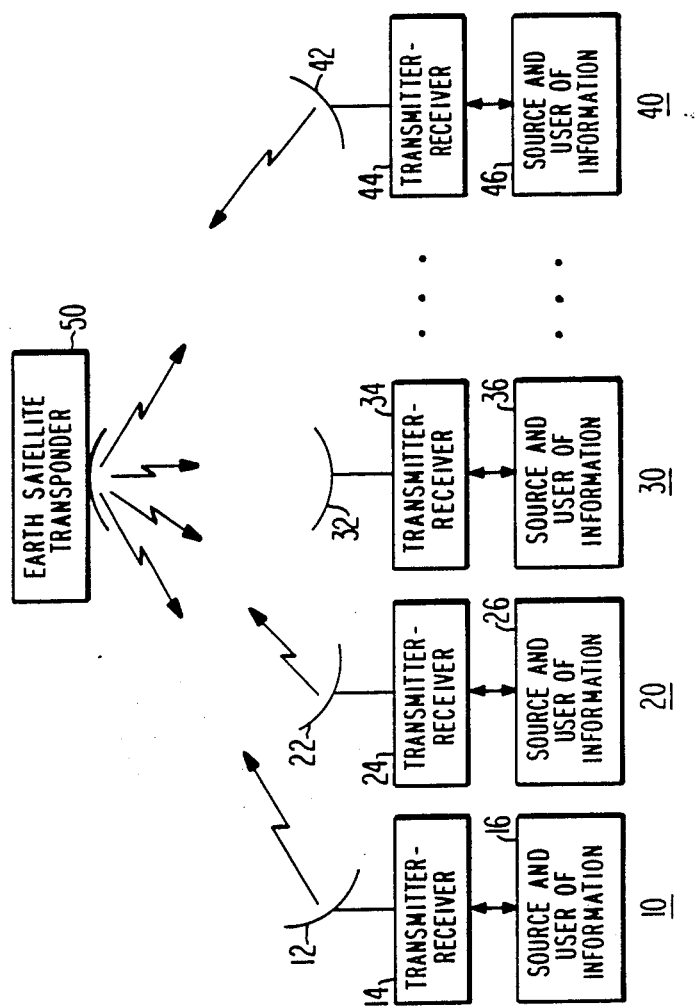
FIG. 1 is a block diagram of a communications system including a number of Earth stations, each including a transmitter-receiver and an associated source and user of information, each transmitter-receiver of which transmits to the transponder of an Earth satellite which retransmits received signals to all transmitter-receivers.

FIG. 1 is a block diagram of a communication system by which a number of Earth stations designated generally as 10, 20, 30 and 40 communicate among themselves by way of a transmission path including a transponder 50 at an Earth satellite. Earth station 10 includes an antenna 12, transmitter-receiver 14, and a source and user of information 16. Block 16 will ordinarily include a computer or data processing apparatus which is to communicate with the corresponding computers of other stations. Each of the other Earth stations, designated 20, 30 and 40, includes an antenna 22, 32, and 42; a transmitter-receiver 24, 34 and 44; and a source and user of information 26, 36, and 46 respectively. All the Earth stations are identical, although each has a unique identifying address for tagging data which it originates and for identifying data addressed to it. As illustrated by arrows in FIG. 1, Earth stations 10, 20 and 40 are at the instant shown transmitting towards satellite transponder 50, which receives and retransmits the signals (ordinarily with a frequency translation) for reception by all of the Earth stations of the communications system, including Earth station 30. Transponder 50 is mounted on a satellite which is in a geostationary orbit, which establishes its altitude as 22,400 miles. The round-trip transmission path between a transmitter-receiver (Tx-Rx) and any other transmitter-receiver is therefore 44,800 miles. The round-trip delay for the transmission is approximately 0.25 second plus any retransmission delay in the transponder. The total delay is substantially greater than the duration of a low duty cycle information burst. Under such conditions, it is not possible for any transmitter-receiver to determine the current status of the sending end of the transmission path. The activity at the sending end of the transmission path includes transmission events occurring at any of the plurality of transmitter-receivers. The most current information available to any Tx/Rx relating to the sending end of the transmission path is derived from the signal received from satellite 50, which relates to a condition which existed about 0.25 second earlier. Thus, it is not possible to delay transmission until the sending end is idle as in carrier sensing schemes, nor is it possible to truncate packets in response to a perceived collision.

Figure 2:
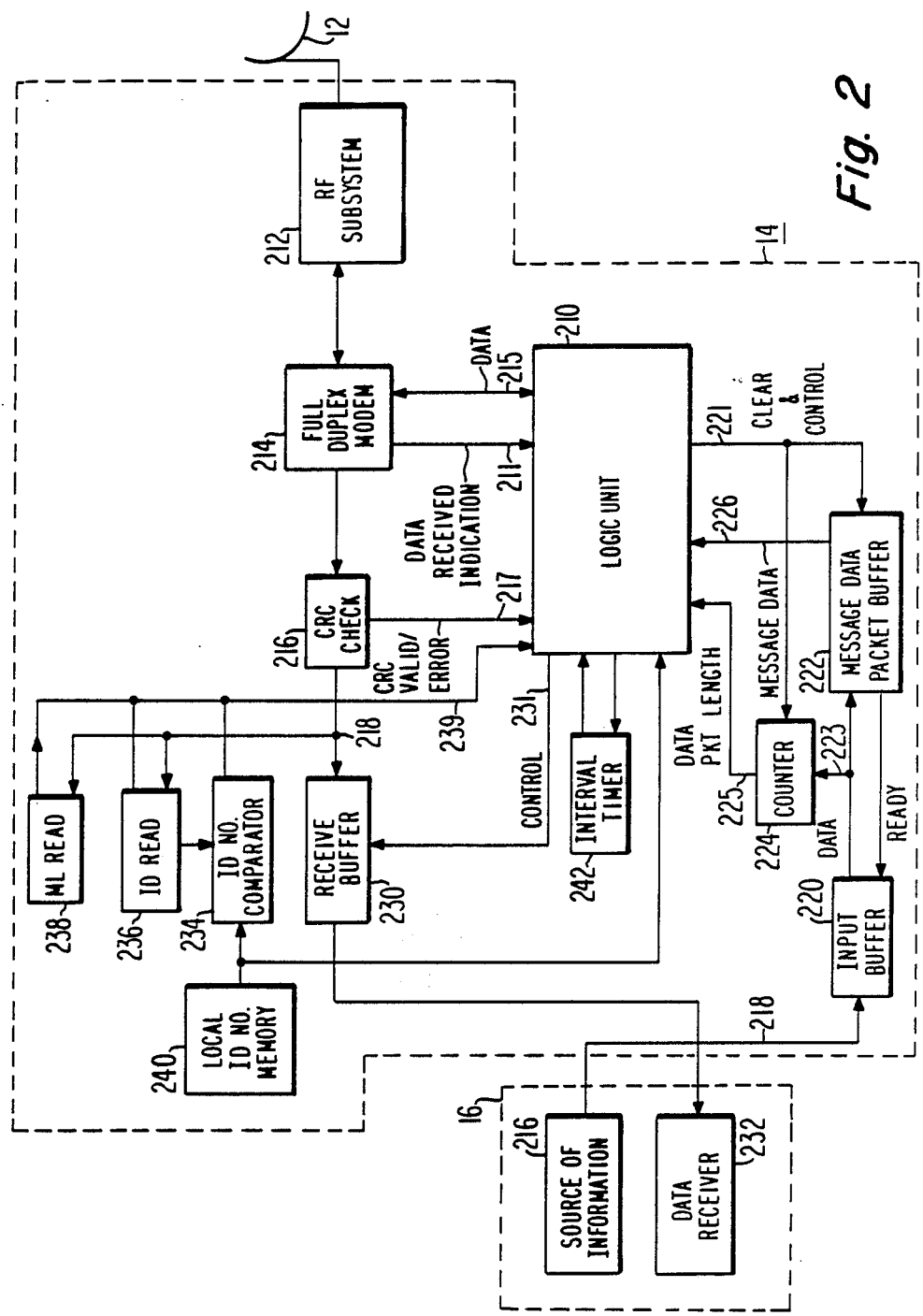
FIG. 2 is a simplified general block diagram of one of the Earth stations of FIG 1.

FIG. 2 is a general block diagram of Earth station 10 of FIG. 1. Elements of FIG. 2 corresponding to those of FIG. 1 are designated by the same reference numerals. In FIG. 2, transmitter-receiver 14 receives information from a source of information 216 (part of source and user of information 16), and encodes the information received from source 216 into a digital format by means of an analog-to-digital converter (ADC, not illustrated) if it is not already in digital form. Source of information 216 supplies the information over a conductor 218 to an input buffer 220 of transmitter-receiver 14. As known, the information may be in a form of serial data, in which case conductor 218 is a single conductor, or it may be supplied in parallel, in which case conductor 218 is a set including a plurality of conductors. Since this is well understood in the art, all conductor sets are hereinafter described as through they were single conductors. Input buffer 220 receives the data and stores it until receipt of a READY signal produced by a message data packet buffer 222 when it is empty. Upon receipt of the READY signal, buffer 220 applies data to message data packet buffer 222 and to a counter 224 by way of a conductor 223. Counter 224 counts the number of bits being applied to message data packet buffer 222, and produces a signal on a conductor 225 representing the length of the data packet stored in message data packet buffer 222, for application to a logic unit or processor 210. Logic unit 210 is coupled to message data packet buffer 222 and to counter 224 by a conductor 221 for clearing of buffer 222 and counter 224, and for control thereof. Upon instructions from logic unit 210 to message data packet buffer 222 over conductor 221, buffer 222 applies the message data over a conductor 226 to logic unit 210. As described below, message data is read from buffer 222 in a discontinuous manner in order to subpacketize the message into subpackets of fixed duration.

Antenna 12 is connected to a radio frequency (RF) subsystem illustrated as block 212, which downconverts signals received by antenna 212 and demodulates the signals to baseband for application to a full duplex modem 214, and which also receives baseband signals to be transmitted from modem 214 and upconverts them for transmission by antenna 12. Such RF subsystems are well known in the art and require no further explanation. Modem 214 applies a signal to logic unit 210 over a conductor 211 during those times when data is being received.

In its transmitting mode, modem 214 receives from logic unit 210 over conductor 215, in sequence, the subpackets of a subpacketized message packet, each of which includes a combination of message data, subpacket number information and other overhead information, as described in detail below. Modem 214 applies the subpacketized message packet to RF subsystem 212 for transmission. The demodulated signals received by modem 214 from RF subsystem 212 are applied to a cyclic redundancy check (CRC) unit illustrated as a block 216 for testing of the received signals for errors. CRC unit 216 produces a CRC valid/error signal which is applied by way of a conductor 217 to logic unit 210. If two or more signals are received concurrently or simultaneously (i.e. if a collision occurs), errors ordinarily occur in the demodulated data, which will result in an error signal from CRC unit 216 to logic unit 210.

Received data is applied from CRC unit 216 by way of a conductor 218 to a receive buffer 230, in which the received data is stored before being applied to the data receiving portion 232 of the source and user of information 16. Logic unit 210 controls buffer 230 by signals applied over a control conductor 231. The data applied from CRC unit 216 to buffer 230 is also applied by conductor 218 to an address or identification number (ID) reader 236 and to a message length (ML) or subpacket number read unit 238. ID number comparator 234 continuously receives a signal from a memory 240 which represents the address or identification (ID) number of the particular transmitter-receiver (in this case transmitter-receiver 14), and also receives from ID read unit 236 the ID of the subpacket currently being received. ID number comparator 234, identification number read unit 236, and ML read unit 238 are coupled to logic unit 210 by a conductor 239 for applying information to logic unit 210 relating to received subpackets. An interval timer illustrated as 242 is coupled to logic unit 210.

In a first mode of operation, each identical transmitter-receiver of the system of FIG. 1, (functionally identical except for their local address or ID number) asynchronously receives in its input buffer 220 message data generated for transmission by its associated source of information 216. Upon receipt of such message data to be transmitted, each transmitter-receiver by means of counter 224 determines the length of the data packet to be transmitted, and forms the message data into subpackets of fixed duration, each of which has an overhead. The overhead of each of the subpackets formed by a transmitter-receiver includes its own ID number (i.e. the ID number of the source transmitter-receiver), information relative to ML, (the length of the whole message packet, and more particularly the number of subpackets in the data packet) and includes parity bits or other overhead bits as required for cyclic redundancy check and housekeeping functions as well known in the art. Each subpacket so formed has a uniform predetermined length or duration ($D_r$) which is substantially shorter than the average length of the message data packet. Thus, a typical message packet contains two or more subpackets. As soon as they have been generated at a transmitter, the subpackets are transmitted in a continuous sequence on the channel or transmission path by the transmitter. The transmission is asynchronous, in that the transmission time is random and unrelated to any system-wide event, except as explained below. A random transmission time for the sequence of subpackets of the message packet is guaranteed if the sources of information associated with the various transmitter-receivers are not synchronized. Alternatively, logic unit 210 may include a random delay generator which reads buffer 222 at a random time; this is particularly advantageous when the source of data (216 of FIG. 2) has substantial data to transmit which might result in a continous flow of data to the associated transmitter-receiver. After a time delay equal to the round trip path delay to the satellite, all receivers of the system receive the message packet transmitted by any one transmitter-receiver. Thus, each transmitter-receiver of the system receives from the satellite its own ("own") message packets (in the form of a sequence of subpackets) and "other" message packets (also in the form of a sequence of subpackets) which originate from other transmitter-receivers of the system. Assuming that a message packet is received without collision with another message packet, that transmitter-receiver to which the message was addressed couples the data to its associated user of information, and all other transmitter-receivers (to which the message was not addressed) discard the data. Consequently, when the system is lightly loaded, the delay in message transmission is likely to be only slightly more than the round-trip satellite path delay.

In the event that no subpacket of a message packet is received because of a collision with another message packet or packets or for any other reason, the entire message packet is lost, and the originating transmitter-receiver becomes aware of the failure after the round-trip time because it does not receive any of its own subpackets, and at a random time thereafter (as described in more detail below) retransmits a subpacketized message packet containing the same information and overhead. In this case, the total message delay is slightly more than 2 round-trip path delays plus a random delay.

During the interval in which transmitter-receiver 14 is receiving information from satellite 50 by way of antenna 12, logic unit 210 (FIG. 2) stores information relating to the origin of each subpacket which is successfully received and the sequence order in which it is received, and the number of subpackets which the header of each subpacket states is in the total message packet originating from the transmitting source. Logic unit 210 also counts the number of successfully received subpackets (subpackets without errors as indicated by CRC check unit 216) following a particular reference time. When a particular number of subpackets has been successfully received, as for example, 12 subpackets, logic unit 210 causes the system to switch into a second mode of operation. Since each transmitter-receiver receives essentially the same information from satellite 50, the counting of the particular number of successfully received subpackets occurs at all transmitter-receivers simultaneously, and all transmitter-receivers switch into the second mode of operation at the same time or in synchronism.

In the second, synchronized or scheduled mode of operation, those transmitter-receivers whose own previously transmitted message packets were successfully received (i.e. all subpackets of the message packet were successfully received) are inhibited from initiating new subpacket transmissions, and those transmitter-receivers which did not transmit at all during the preceding first or contention mode of operation are also inhibited from initiating new subpacket transmissions. Additionally, those transmitter-receivers which transmitted message packets during the preceding first or contention mode of operation, but which did not receive back any own subpackets, are inhibited from initiating new subpacket transmissions during the next following scheduled mode of operation. In the second or scheduled mode of operation, transmitter-receivers whose own message packets included some subpackets which were successfully received and some subpackets which were not successfully received during the preceding first or contention mode of operation transmit the information contained in those subpackets which were not successfully received in the form of new subpackets organized into message packets. The retransmission of information lost due to collisions occurring during the first mode of operation (and possibly during a small portion of the beginning of the second mode of operation, as described below) is retransmitted by the various transmitter-receivers of the subsystem in the same order as that in which successful subpackets from partial message collisions are received, which is the order in which they were originally transmitted and would have been received but for collision events. This is possible because, as mentioned, all transmitter-receivers of the system receive the same information from satellite 50, and a collision results in the loss of the same subpackets and packets at all transmitter-receivers. As mentioned, each subpacket contains information indicating the number of subpackets which are included in each message packet, as well as origin ID, and each transmitter-receiver keeps track of the origin of each subpacket and the number of subpackets which are included in each message packet, so the origin of all successfully received subpackets of a message packet is known to all transmitter-receivers of the system. By extension, the origin of subpackets not successfully received is also known, because the subpackets which were successfully received carry information relating to their origin and total number. Thus, by analyzing the received information from the asynchronous mode, it is now possible to schedule the order of the retransmissions, except for the unlikely cases in which all subpackets in a message are destroyed by a collision. The simplest ordering of the retransmitted packets is on a "first come, first serve" basis, but any desired order (based on the sequence of successfully received subpackets from message packets encountering partial collisions) can be used. Since all transmitter-receivers other than those which had partially successful message packet transmissions during the previous contention mode are inhibited from new transmissions during the second mode of operation, the retransmissions are guaranteed to be received free of collisions. In effect, the transmissions in the second mode of operation are synchronized relative to the time of switchover from the first (contention) mode to the scheduled second mode. The described system has a capacity of about 0.5 for variable length messages (depending upon the message length distribution), has relatively low average delay (depending upon load) and depends for the limited synchronization upon simple observation of channel events occurring simultaneously at all transmitter-receivers.

Figure 3:
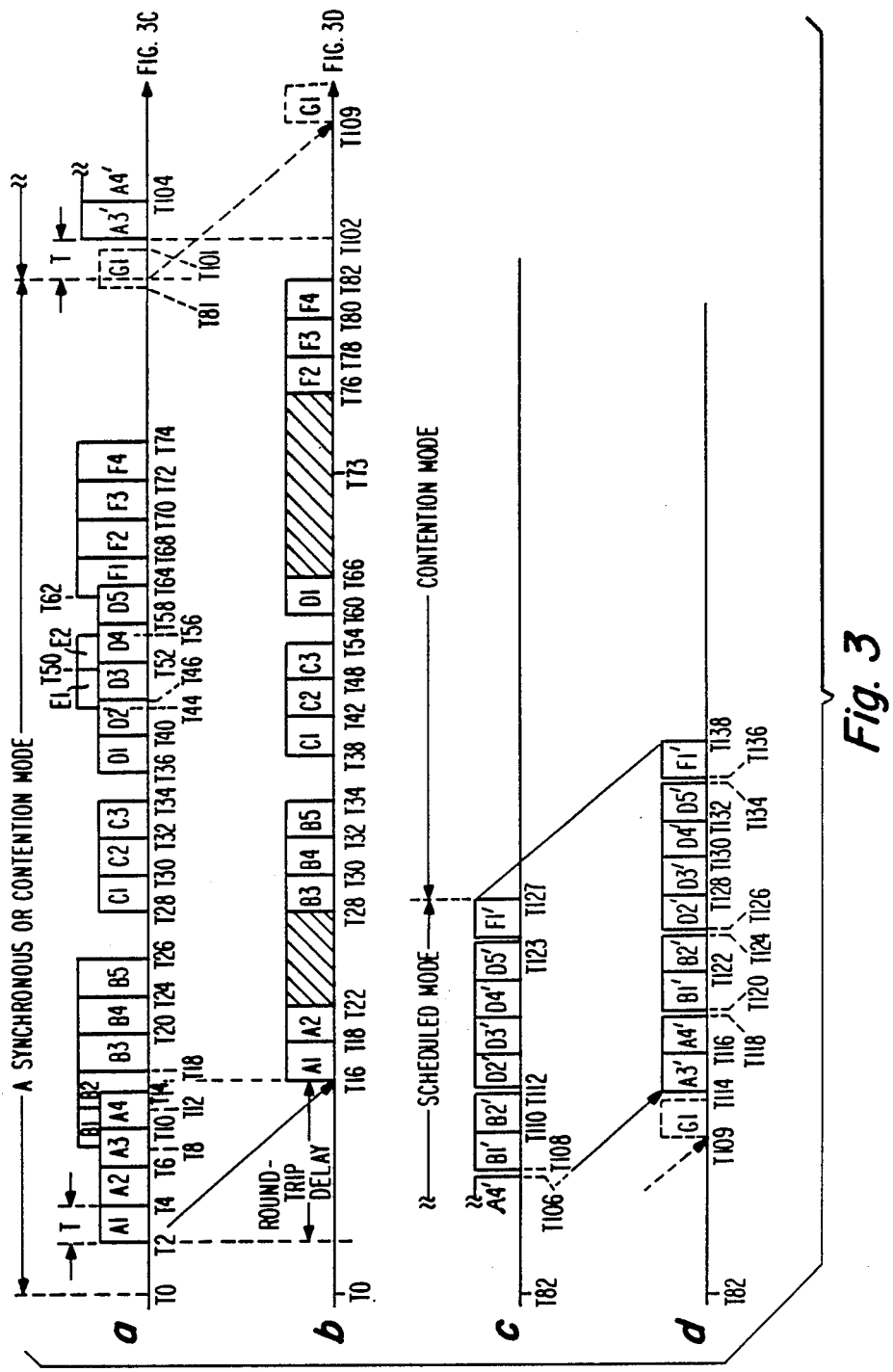
FIGS. 3a, 3b, 3c and 3d, referred to jointly as FIG. 3, are time lines representing by FIG. 3a and its extension 3c all transmission events occurring at any transmitter-receiver of the system of FIG. 1, and by FIG. 3b and its extension 3d those reception events occurring simultaneously at all transmitter-receivers of the system of FIG. 1, pursuant to a protocol according to the invention.

FIG. 3a represents a time line of events occurring at the transmitting or sending end of the communication channel, and FIG. 3b represents a time line of events occurring at the receiving end. For this purpose, the "transmitting end" events are the transmissions which occur at any of the transmitter-receiver locations directed towards satellite 50 of FIG. 1, and the "receiving end" events are simultaneous reception events at all transmitter-receivers of signals from satellite 50. FIG. 3c is a continuation of the time line of FIG. 3a, and FIG. 3d is a continuation of the time line of FIG. 3b. It should be emphasized that the time interval represented in FIG. 3 is selected to illustrate slightly more than one complete cycle of an unending steam of recurrent cycles of alternating intervals of contention and scheduled operating modes.

In FIG. 3, times before time $T_0$ represent operation in a previous interval of the scheduled operating mode, which is described in greater detail below. Time $T_0$ represents the transition between the preceding interval of the scheduled operating mode and an interval (T0 to T82) of asynchronous or contention operating mode. In the contention mode of operation, any transmitter-receiver which has information to be transmitted selects a random time (which may be the time at which the information is received from the associated source for transmission) and transmits the information. Time $T_2$ represents the time at which a transmitter-receiver arbitrarily designated "A" begins to transmit the first subpacket A1 of a message packet including four subpackets. For convenience, the four subpackets transmitted by transmitter-receiver A are designated A1, A2, A3 and A4. This designation scheme is used throughout the following description, and thus, for example, F3 represents the third subpacket of a message packet transmitted by transmitter-receiver designated F. Subpacket A1 includes a header or preamble (not illustrated) which carries information relating to the source transmitter-receiver (in this case transmitter-receiver A), the destination transmitter-receiver(s), and the number of subpackets in the message packet (in this case four). Subpacket A1, and all other subpackets, also include overhead, such as cyclic redundancy codes, which is used at least for error detection and also possibly for error correction. At time T4, transmission of subpacket A1 ends, and transmission of subpacket A2 begins. Subpacket A2 is transmitted in the interval T4–T6, followed in succession by subpackets A3 in the interval T6–T10 and A4 in the interval T10–T14. As illustrated, subpackets A1 through A4 are transmitted in a continuous sequence without intervening time, but a small intervening interval could separate the subpackets. Thus, subpackets A1 through A4 are transmitted contiguously, that is to say either without intervening time or with a slight intervening time.

As mentioned above, in the asynchronous transmission mode transmitter-receivers of the system are ignorant of transmission events currently occurring at other transmitter-receivers of the system, and therefore act independently. Thus, another transmitter B of the system is not aware until a later time of the fact that transmitter A transmitted subpackets A1-A4 in the interval T2-T14. Therefore in the asynchronous or contention mode of operation, transmitter B randomly selects a time illustrated as T8 in which to begin transmission of a message packet including subpackets B1, B2, B3, B4 and B5, which are illustrated in FIG. 3a. As illustrated therein, the vertical dimension of subpackets B (that is, subpackets B1 to B5) is larger than that of subpackets A. The vertical dimension has no meaning, and is selected only to clearly distinguish between the packets in the FIGURE. As illustrated in FIG. 3a, time T8 at which message packet B begins occurs between times T6 and T10. Consequently, transmission of subpacket B1 occurs during the same time as that in which transmitter A is transmitting portions of subpackets A3 and A4, and subpacket B2 is transmitted in part during the time in which subpacket A4 is being transmitted. However, neither transmitter-receivers A nor B can become aware of this simultaneous transmission until after the round-trip time. In accordance with the system protocol, transmitter B transmits it's message packet including subpackets B1 through B5 contiguously in the interval T8–T26. Referring now to FIG. 3b, subpacket A1 transmitted beginning at time $T_2$ by transmitter-receiver A has completed its round-trip path, and begins to be received by all transmitter-receivers of the system beginning at a time T16. Thus, the round trip delay between a transmission by any transmitter-receiver and reception by all transmitter-receivers is represented by the interval T2–T16 or any other corresponding interval. Since no transmissions were made by transmitter-receivers other than A during transmission of subpackets A1 and A2, as illustrated in FIG. 3a, subpackets A1 and A2 are successfully received by all transmitter-receivers of the system in the interval T16–T22. Errors or loss of transmission due to events other than collisions are not common in such a system, but it is noted that such events are handled adequately by the described protocol. Since both transmitters A and B transmitted in the interval T6–T10 as illustrated in FIG. 3a, at least a portion of the A3 and B1 packets are received simultaneously in the interval after time T22, as illustrated as FIG. 3b, and as a result the information in the entire A3 subpacket is lost or is considered lost because the extent of error cannot be determined. Similarly, all the information in the A4 subpacket is lost, and the information of the B1 and B2 subpackets is also lost. Thus, all subpackets received by all transmitter-receivers in the interval T22 to T28 are received with errors (unsuccessfully), and this is represented in FIG. 3b by a shaded region. Transmission of the B2 subpacket ends at time T18, and transmission of the B3 subpacket begins. No other system transmission occurred during the transmission of subpacket B3. The B3 subpacket is therefore successfully received by all transmitter-receivers of the system beginning at time T28, as illustrated in FIG. 3b. Similarly, no other system transmissions occurred during transmission of the B4 and B5 subpackets. Therefore, the B3, B4 and B5 subpackets are received without errors attributable to collision beginning at times T28, T30 and T32, respectively, as illustrated in FIG. 3b.

As mentioned, all transmitter-receivers of the system receive subpackets A1 and A2 free of errors in the interval T16-T22 (FIG. 3b). Since the headers of both subpackets A1 and A2 identify the source transmitter-receiver as being transmitter-receiver A, and also include a length representative word ML which indicates that transmitter-receiver A'S entire message packet includes four subpackets, all transmitter-receivers of the system can calculate that two subpackets are to be retransmitted by transmitter-receiver A during the scheduled mode of operation following the current contention mode of operation. The (those) transmitter-receiver(s) identified in the header information as destination(s) for the data contained in subpackets A1 and A2 store the subpackets. Similarly, all transmitter-receivers of the system successfully receive subpackets B3, B4 and B5. Each of subpackets B3, B4 and B5 includes in its header information that the source of subpackets B3, B4 and B5 is transmitter-receiver B, the identity of the destination of the subpackets, and information that there are a total of five subpackets in the whole message packet transmitted by transmitter-receiver B. From this, all transmitter-receivers of the system can calculate that transmitter-receiver B will transmit three subpackets during the next following scheduled interval, and that successful reception of subpackets orginated by transmitter-receiver A preceded those successfully received from transmitter-receiver B. The destination transmitter-receivers store the data from packets B3, B4 and B5, and non-destination transmitter-receivers discard the data (but not the header information). This information will be useful at a later time.

As illustrated in FIG. 3a, no transmissions occur in the interval T26-T28. Beginning at a randomly selected time near time T28, and extending to a time near time T34, transmitter-receiver C transmits a message packet including the three subpackets C1, C2 and C3. The transmissions happen to be made near enough to the interval T28-T34 so that the starting and ending times are illustrated as T28 and T34, respectively, for simplicity of illustration. No transmissions are made by other transmitter-receivers of the system in the interval T28-T34, and as a result subpackets C1, C2 and C3 are received without collision (and therefore successfully) in the interval T38-T54, as illustrated in FIG. 3b. All transmitter-receivers of the system successfully receive subpackets C1, C2 and C3, and know that the transmissions originated from transmitter-receiver C, and that the message packet transmitted by transmitter-receiver C included three subpackets. Also, all transmitter-receivers of the system have counted the subpackets originating from transmitter-receiver C which they have successfully received, and at a time T54 all transmitter-receivers of the system has the information required to know that three such subpackets have been received. Thus, all transmitter-receivers of the system know that transmitter-receiver C does not need to retransmit any subpackets during the next following interval of scheduled mode operation. Each of the transmitter-receivers of the system examines the header information relating to the destination of the data associated with subpackets C1, C2 and C3, and those transmitter-receivers to which the information is not addressed discard the data, while those transmitter-receivers to which the information is addressed transfer the data to the their associated user of information. All transmitter-receivers of the system store the header information from subpackets C1, C2 and C3 for later use.

Referring again to FIG. 3a, no transmissions are made by any transmitter-receiver of the system in the interval T34-T36. Beginning at randomly selected time T36 and extending until time T64, transmitter-receiver D transmits contiguous packets D1, D2, D3, D4 and D5. Beginning at a randomly selected time T44 (which occurs during transmission of packet D2), a transmitter-receiver E begins transmission of a message packet including subpackets E1 and E2. Transmission of the message packet by transmitter-receiver E ends at a time T56. As illustrated in FIG. 3a, transmission of subpacket E1 occurs over a time interval which spans the transmission time of subpackets D2 and D3, and transmission of subpacket E2 spans the transmission time of portions of subpackets D3 and D4. Yet another transmitter-receiver of the system (F) begins transmission at a randomly selected time T62, which is prior to time T64 at which transmitter-receiver D ends its transmissions. Transmitter-receiver F transmits a contiguous stream of packets F1, F2, F3 and F4, ending at a time T74. Thus, transmissions occur at the sending end of the transmission channel beginning at time T36 and ending at time T74.

Referring now to FIG. 3b, subpacket D1 which was originally transmitted beginning at time T36 (FIG. 3a) begins to be received by all transmitter-receivers of the system at time T60. Since no other transmissions occurred simultaneous with subpacket D1, subpacket D1 is successfully received by all transmitter-receivers of the system in the interval T60-T66. Since subpacket D1 is successfully received by all transmitter-receivers, all transmitter-receivers have the information necessary to determine that the origin of the message packet was transmitter-receiver D, and that five subpackets are in the associated whole message packet. Also, since all transmitter-receivers note the order in which various transmitter-receivers have partially successful transmissions, all transmitter-receivers know that during the next following interval of scheduled mode operation, transmitter-receiver D will be third to transmit, after A and B (C was completely successful and needs no retransmission). The interval T66-T76, in which reception of subpackets D2, E1, D3, E2, D4, D5 and F1 could have been expected, does not result in successful reception because of the overlapping reception times, and is shaded in FIG. 3b to represent unsuccessful reception. Successful reception by all transmitter-receivers begins at time T76 with the beginning of reception of subpacket F2, and extends to time T82. In the interval T76-T82, subpackets F2, F3 and F4 are successfully received. Reception of even one of subpackets F2, F3 or F4 provides all transmitter-receivers of the system with the information that a message packet originated with transmitter-receiver F, and that there were four subpackets in the message packet.

It should be noted that no transmissions were successfully received from transmitter-receiver E. At a time near time T73 (FIG. 3b), transmitter-receiver E knows that a round-trip delay interval has elapsed, and that it has not successfully received any subpacket of its own message packet. Thus, transmitter-receiver E has the information which it requires to determine that other transmitter-receivers of the system have not received its transmissions, that they will not schedule time for retransmission, and that it will not transmit during the next following interval of scheduled mode operation. Transmitter-receiver E must wait to transmit until the next following interval of contention mode operation, and select a random time during the next following contention mode for retransmission of the information contained in subpackets E1 and E2.

As mentioned, all transmitter-receivers of the system have been counting the total number of successfully received subpackets, as well as their origin and order of receipt. At time T82, all transmitter-receivers of the system have successfully received a total of twelve subpackets. Consequently, all transmitter-receivers of the system set a time marker at time T82, switch from the contention operating mode to the scheduled operating mode, and begin an interval of scheduled mode of operation. During the scheduled mode interval, the data of all unsuccessful subpackets which were transmitted as part of partially successful message packets in the interval T0-T82 is retransmitted. Beginning at time T82 and until the time of the end of the following interval of scheduled mode operation (time T138), all new subpacket transmissions are inhibited except for those scheduled as a result of successful reception of some subpackets and unsuccessful reception of other packets of message packets transmitted during the previous interval of contention mode operation (T0-T82).

In accordance with the system protocol, no scheduled transmissions begin until a time T102, which follows time T82 (the time marker) by a delay equal to TMAX, the maximum duration of a message transmission. As illustrated in FIGS. 3a and 3b, time TMAX has a duration of one subpacket duration (T), but it will be understood that TMAX could equal, for example, five subpacket durations (5T). This time is allotted to assure that the transmissions occurring during the interval of scheduled mode of operation are not interfered with by transmissions of message packets, the last subpackets of which happen to begin during the contention mode as late as just before time T82 but which end their transmission time in the interval between times T82 and T102. The possibility of such subpackets is illustrated in FIG. 3a by subpacket G1 in dashed outline, transmitted beginning at time T81 and ending at time T101. The delay of the beginning of scheduled transmission until time T102 is provided to guarantee that a possible transmission such as G1 does not collide with the scheduled transmissions, but it also means that subpackets such as G1 may be received successfully during the scheduled mode interval. By extension, other contention-mode subpackets transmitted in the interval T74-T102 may be successfully received in the time after time T82.

As mentioned, the end of transmission of the last possible contention-mode packet occurs at time T102. Time T102 may be delayed from time T82 for slightly more than T, the duration of a subpacket, by an amount ΔT, sufficient to take into account timing inaccuracies of the system, thereby providing assurance against inadvertent collisions. Time T82-T102 also allows time for completion of the calculations which must be made by all transmitter-receivers of the system which are to transmit during the scheduled mode. Generally speaking, each transmitter-receiver, once it has determined that it has both successfully received some subpackets of its own message packet and has not received other packets, must establish a transmission order in some manner so that all transmitter-receivers do not begin to transmit at time T102. All transmitter-receivers of the system (whether they retransmit or not) must perform calculations so as to know when the scheduled mode of operation ends. This calculation is based upon a knowledge of the number of subpackets which are to be transmitted during the scheduled mode, the duration T of each subpacket (which is fixed) and the need for an additional one maximum message length interval delay (in the interval T82-T102).

All transmitter-receivers of the system know that the first subpacket successfully received during the contention mode interval (T0-T82) originated with transmitter-receiver A as illustrated in FIG. 3b, and that two subpackets from transmitter-receiver A are to be transmitted during the following scheduled interval. They further know that the second transmitter-receiver from which subpackets were successfully received was B, and that B must also retransmit the data from two subpackets. All transmitter-receivers of the system know that transmitter-receiver C successfully transmitted all subpackets, and will not transmit during the interval of scheduled operation, so no time is scheduled for transmissions by transmitter-receiver C. The third transmitter-receiver from which subpackets were both successfully and unsuccessfully received is known to be D, and four subpackets are expected from transmitter-receiver D. As mentioned, transmitter-receiver E had unsuccessful transmissions, but that fact is not known to any transmitter-receiver of the system other than transmitter-receiver E, and consequently, according to the system protocol, no time is allotted during the interval of scheduled mode of operation for transmission by transmitter-receiver E. Since both successful and unsuccessful subpackets were received from transmitter-receiver F, it will transmit one subpacket during the interval of scheduled mode of operation. Thus, all transmitter-receivers of the system know that the number of subpackets to be transmitted during the scheduled mode interval following time T82 is nine (two from A, two from B, four from D, and one from F), and the duration of the scheduled mode interval is therefore 10 (i.e. 9+1) subpacket durations (including the interval T82-T102) plus guard intervals. Thus, all transmitter-receivers of the system know that the scheduled mode interval ends at time T127, and that after time T127 they may again transmit at random times.

Since transmitter-receiver A was the origin of the first subpacket to be received during the previous contention mode interval among those transmitter-receivers which transmitted both successful and unsuccessful subpackets, it is the first to initiate transmissions during the scheduled mode interval T81-T127. The transmissions begin at time T102, and the data associated with subpacket A3 originally transmitted in the interval T6-T10 is retransmitted in a subpacket A3', in the interval T102-T104 (FIG. 3a), and the information originally associated with subpacket A4 is retransmitted as subpacket A4' beginning at time T104 and extending to time T106 (FIG. 3c). At time T106 (or at a slightly later time T108 to allow some margin for timing error) transmitter-receiver B begins transmission of subpacket B1' including the data originally contained in subpacket B1, and completes transmission of subpacket B1' at time T110. It then transmits subpacket B2', and completes transmission of subpacket B2' at about time T112. At or slightly following time T112, transmitter-receiver D transmits the information originally contained in subpackets D2, D3, D4 and D5 in the form of subpackets D2', D3', D4' and D5'. The transmission is completed about time T123. At time T123 or a bit later, transmitter-receiver F transmits a subpacket F1' including the information from previously transmitted subpacket F1. Transmission by transmitter-receiver F ends at time T127, substantially simultaneously with the end of the interval of scheduled mode operation. As mentioned, all transmitter-receivers of the system other than A, B, D, and F are inhibited from new transmissions in the interval of scheduled operating mode extending from time T82 to time T127. Subpackets A3, A4, B1, B2, D3–D5 and F1 are therefore guaranteed to be received successfully (without collision) in the interval extending from time T114 to time T138 (FIG. 3c). Immediately after time T127, another interval of contention mode of operation can be initiated, because all the scheduled mode transmissions have been made. Thus, at a time after time T82 equal to N+1 times T, (where T is the duration of each subpacket, and where N is the number of subpackets to be transmitted during the interval of scheduled mode of operation), plus guard time intervals if desired, the interval of scheduled mode operation ends. This calculation is made by all transmitter-receivers of the system, so that all transmitter-receivers of the system switch from the synchronous or scheduled operating mode to the asynchronous or contention mode simultaneously, at time T127.

This ends a complete cycle of operation which began at time T 0 with a contention mode, and was followed by a scheduled mode which began at time T81 and ends at time T127.

After time T127, the cycle begins again with another contention interval, during which inhibition of new nonscheduled subpacket transmission does not exist, and any transmitter-receiver which has information to be transmitted can select a random time in which to transmit.

If a transmitter-receiver has a long message to be transmitted, it may be desirable, depending upon the system loading and upon other factors, to transmit from the transmitter-receiver a number of subpackets which is less than the number required to fully transmit the message packet, but to indicate in the header of each of the transmitted subpackets a larger number of subpackets than is actually transmitted, which equals the number of subpackets required to fully transmit the message. This will be interpreted by all transmitter-receivers of the system as a partially incomplete message packet, with the result that the additional (nontransmitted) subpackets will be scheduled during the following interval of scheduled mode operation. For example, a transmitter-receiver P may receive, from it associated source of information, a message to be transmitted which would require nine subpackets to transmit in its entirety. At the next following contention mode interval, transmitter-receiver P might transmit five subpackets (or some other selected number less than nine), but indicate in the header of each transmitted subpacket that the whole message packet contains nine subpackets. Even if all five subpackets are actually received during the contention mode, the four additional subpackets which were not transmitted will be scheduled for transmission during the scheduled mode. Such a mode of operation may increase the system capacity when some stations generate relatively long message packets.

Figure 4A:
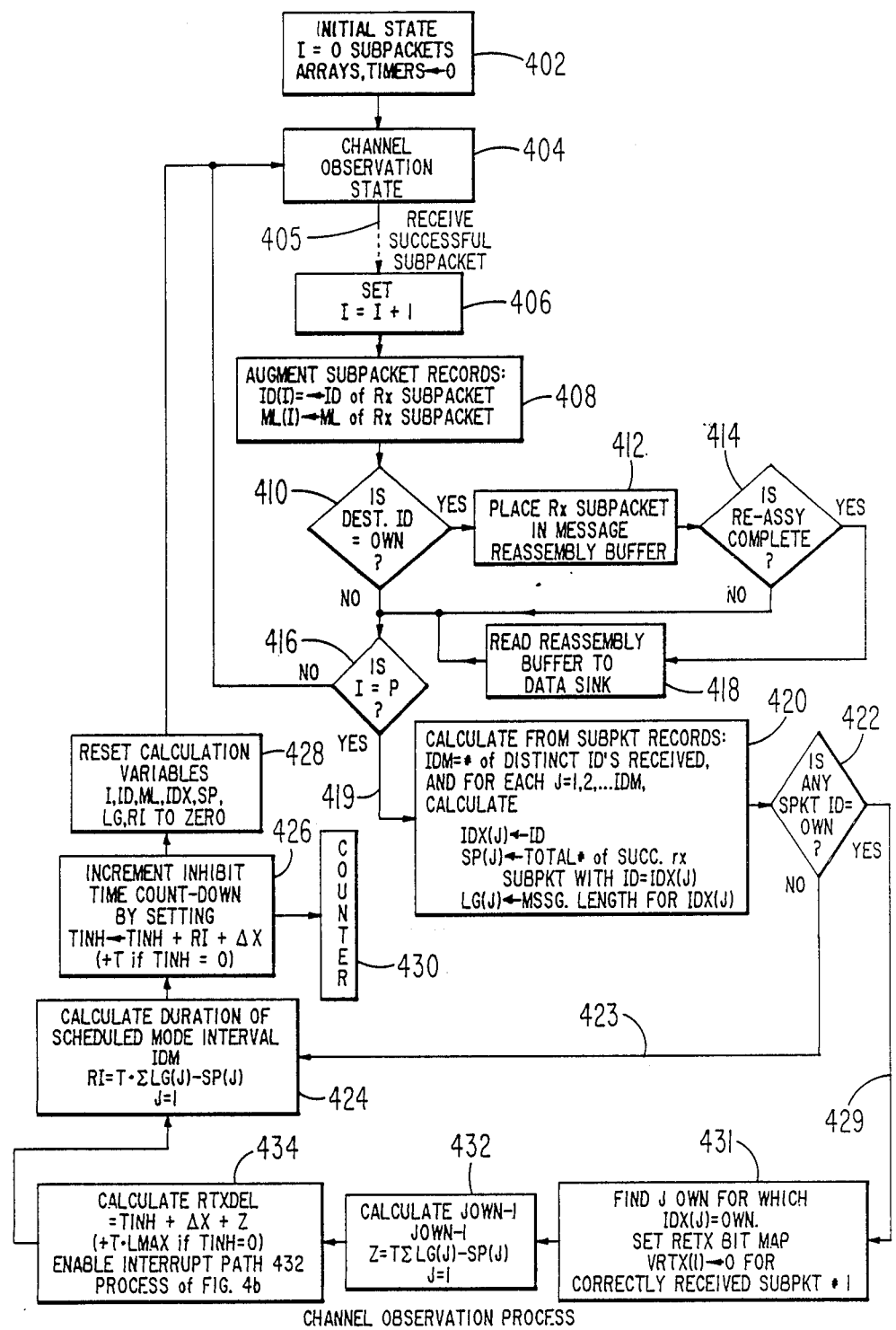
FIGS. 4a and 4b, referred to jointly as FIG. 4, are simplified flow charts together representing the logic operations performed by logic unit 210 of FIG. 2 to implement the protocol described in conjunction with FIG. 3.
Figure 4B:
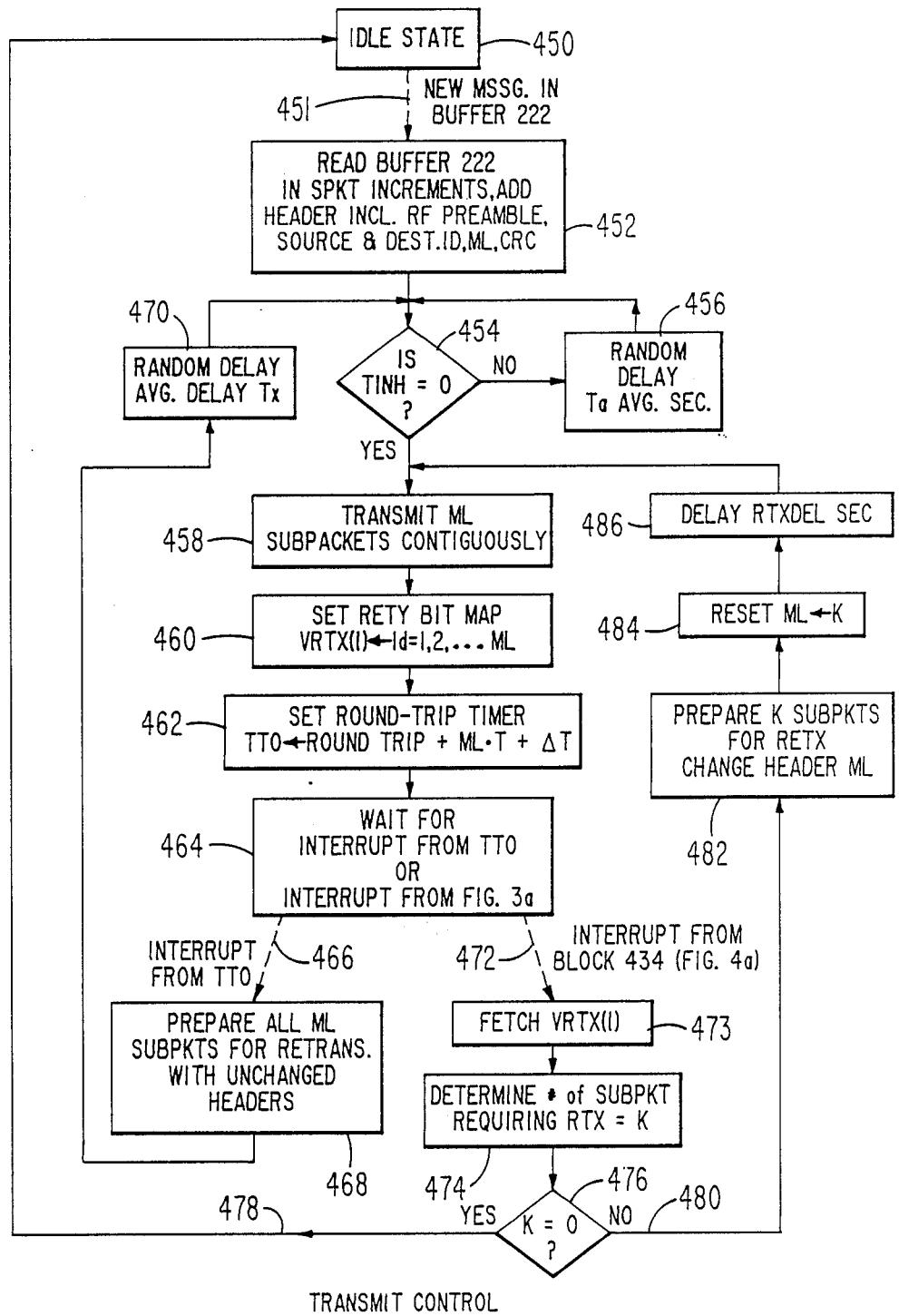

FIGS. 4a and 4b together represent in simplified form the logic flow required in logic unit 210 of FIG. 2 in order to accomplish asynchronous contention operation alternating cyclically with synchronous scheduled operation, as described in conjunction with FIG. 3. Logic unit 210 concurrently runs through two program loops, a first (FIG. 4a) for observing or evaluating the conditions at the receiving end of the transmission path or channel and for determining current mode of operation (i.e. contention or scheduled), and a second (FIG. 4b) for control of transmission and retransmission as necessary depending upon the current mode of operation as established by the first loop. Thus, logic circuit 210 includes a pair of cooperating microprocessors, or a single microprocessor appropriately multiplexed. In the logic flow diagram of FIG. 4, operating states or functions are indicated by rectangles or blocks, and decision points by diamonds. Fixed or noncontingent (sequential) logic flow paths are indicated by solid lines, and paths which are contingent upon events which are extrinsic to logic unit 210 are indicated by dotted lines.

In FIG. 4a, the initial program state is illustrated as a block 402. The initial state begins with the setting of a variable I, representing the number of subpackets successfully received during the asynchronous or contention mode (plus a small amount of the scheduled mode interval), to zero. Arrays and timers internal to logic unit 210 are also set to zero. The logic then waits for successful reception of a subpacket, as represented by channel observation state block 404. The channel observation state is exited by interrupt path 405, upon successful receipt of a subpacket, and the logic arrives at a block 406 which results in the incrementing of variable I to I+1. The ID read unit 236 and ML read unit 238 (FIG. 2) are read, and records internal to logic unit 210 (FIG. 2) are augmented, as represented by block 408. The logic proceeds from block 408 to a decision block 410, in which the destination ID of the received subpacket is compared with the ID number of the receiving transmitter-receiver. If the data of the subpacket is destined for the receiving transmitter-receiver, the YES output of decision block 410 directs the logic to a block 412 which represents the storage of the data of the received subpacket in a message reassembly buffer which may be buffer 230 of FIG. 2, or a buffer internal to logic unit 210. The logic then flows to a further decision block 414 which evaluates the number of subpackets stored in the reassembly buffer, and compares it with the number of subpackets in the complete message, as indicated by the ML of the received subpacket. If the message has not been completely received, the NO output of decision block 414 directs the logic to a further decision block 416. If the message is complete, the YES output of decision block 414 directs the logic to a block 418, which represents the reading of the reassembly buffer to data receiver 232 (FIG. 2). The logic then proceeds to decision block 416, in which the total number of successfully received subpackets is compared with the predetermined number P, which in the example given above is twelve. If twelve subpackets have not been successfully received, the NO output of decision block 416 directs the logic back to the channel observation state represented by block 404. Eventually, when the 12th subpacket has been received, the YES output of decision block 416 begins the process of switching from the contention mode into the scheduled mode of operation, by directing the logic to a block 420. Block 420 represents the initial calculations and determinations necessary to implement the system protocol. In block 420, an array IDX(J) representing the sequence of unique IDs received is determined for all values of J where J is the number of unique identifications in the records of logic unit 210 for the current reception cycle. In the example of FIG. 3, IDX(1) is A, IDX(2) is D, ... IDM=ID(5) is F. Also in block 420, SP(J) is determined, which is the total number of successfully received subpackets having the identification IDX(J). In the example of FIG. 3, SP(1) is 2, because two A subpackets were successfully received, SP(2) is 3 because three B subpackets were successfully received, etc. Further in block 420, LG(J) is determined, which is the total message length for IDX(J). In the example of FIG. 3, LG(1) is 4 because message packet A has four subpackets, LG(2) is 5, etc. Details of the logic flow of block 420 are described in conjunction with FIG. 5. Once these calculations and determinations have been performed, the logic flows to a decision block 422 which compares the identification number associated with each IDX(J) with the ID of the receiving transmitter-receiver. If none of the successfully received subpackets were its own, the NO output directs the logic along a path 423 to a further condition represented by block 424. Block 424 and its succeeding blocks 426 and 428 determine the duration of the interval of scheduled mode operation and update an inhibit counter of the countdown type which is internal to logic unit 210, and which is represented in FIG. 4a by a block 430. Counter 430 is set to a time equal to the total duration of the scheduled interval and is used to control the inhibition of new subpacket transmissions as described below.

Block 424 represents the calculation of the duration of the interval of scheduled mode operation. The retransmission interval RI (which extends from time T102 to time T127 in FIG. 3) is determined as $$RI = T \cdot \sum_{J=1}^{IDM} LG(J) - SP(J) \quad (1)$$

Equation (1) represents the product of T, the duration of each subpacket, multiplied by the number of subpackets to be transmitted during the scheduled interval. The number of subpackets to be transmitted during the scheduled interval is equal to the difference between the message length (in subpackets) of each message packet LG(J), minus the number of successfully received subpackets SP(J), summed for all partially successful transmissions. Block 426 uses the result of the calculation performed in block 424 to increment inhibit time countdown counter 430 by adding to the current remaining inhibit time TINH (TINH stands for Time INHibit) the calculated value of RI from block 424 (plus any known buffer intervals ΔX). This results in the orderly "stacking" of scheduled retransmission intervals in situations where a succession of P subpackets is received before the previous RI is completed. If the current value contained in counter 430 happens to be zero, a further value of T is also added as initial guard time, as discussed earlier. This completes the calculations relating to the total duration of the period in inhibition for all transmitter-receivers which are not scheduled to transmit. The logic then flows to a block 428 which resets all the calculation variables I, ID, ML, IDX, SP, LG and RI to zero, and the logic returns to the channel observation state represented by block 404.

Returning now to decision block 424 of FIG. 4a, if it is found that the received subpackets include the transmitter-receiver's own subpacket(s), the YES output directs the logic by path 429 to a block 431 and from there to blocks 432 and 434. In general, blocks 431, 432 and 434 represent the calculations and determinations necessary to order the transmitter-receiver's own retransmission among the other retransmissions to be made during the scheduled interval. Block 431 represents the location of all records J (own) for which IDX(J) equals own. This means determination of that J=JOWN (i.e. 1, 2, ... or IDM) which is the J corresponding to its own identification number. Also, block 431 represents the setting of a retransmission bit map as described in more detail in conjunction with FIG. 6. The bit map represents the successful or unsuccessful nature of each subpacket of the MESSAGE PACKET. Initially the bit map is set to all 1's (indicating not received successfully). As each subpacket is successfully received, the bit map is updated in block 430 of FIG. 4a by setting the bits corresponding to those subpackets correctly received to 0. Then only those subpackets with the bit map value VTRX(l)=1 are retransmitted. Block 432 represents the calculation of the interval Z, which is the interval between the beginning of the retransmission interval (time T102 FIG. 3) and the beginning of transmission by the particular transmitter-receiver (for example, time T112 in FIG. 3 for transmitter-receiver D). The calculation of Z is performed according to the equation $$Z = T \cdot \sum_{J=1}^{JOWN-1} LG(J) - SP(J) \quad (2)$$

Equation (2) represents a time (Z) which equals the product of T (the duration of one subpacket) multiplied by the total number of subpackets to be transmitted before the beginning of the first own subpacket. The number of subpackets to be transmitted by transmitter-receiver A is LG(1)-SP(1), that to be transmitted by transmitter-receiver B is (LG(2)-SP(2), ... etc. The sum of all subpackets preceding the own subpackets is the summation from J=1 to J=own-1 of LG(J)SP(J), as indicated in EQUATION 2. When the calculation is completed in block 432, the logic flows through block 434, which calculates the retransmission delay RTXDEL according to the equation $$RTXDEL = TINH + Z + \Delta X \quad (3)$$

where TINH is read from counter 430. In effect, the time represented by Z is added to the current time of inhibition to aid in the stacking of scheduled retransmission intervals. It should be noted that the calculation of RTXDEL occurs in the logic flow before counter 430 is incremented, so that RTXDEL is calculated from time T102 (FIG. 3). Block 434 also represents enabling of the interrupt path 472 of the transmission process in FIG. 4b to activate the transmission process, and represents making the retransmission delay RTXDEL and the bit map VRTX(l) available to the transmission control routine represented by FIG. 4c.

FIG. 4b represents the logic flow for control of the transmission process in the arrangement of FIG. 2 in accordance with the protocol of FIG. 3. In FIG. 4b, the idle state is represented by a block 450. The logic leaves the idle state by an interrupt path 451 when a new message fills message data packet buffer 222 of FIG. 2. The logic then reaches block 452 which represents the reading of buffer 222 (FIG. 3) in subpacket increments, into buffers internal to logic unit 210 (FIG. 3), the addition of headers including the RF preamble required for synchronization of the modems, source and destination ID numbers, message length information and error detection codes. The logic leaves block 452 and arrives at a decision block 454, which represents examination of the remaining count TINH in counter 430 illustrated in FIG. 4a. If the TINH count has not reached zero, the NO output of block 454 directs the logic to a random delay illustrated as a block 456 which delays by an average delay of Ta, which may be on the order of 0.1 to 0.2 seconds, and the logic returns after the specified delay to the input of decision block 454. Thus, new transmissions cannot occur during the inhibition time associated with the scheduled operating mode. If counter 430 (FIG. 4a) has counted down to TINH=0, the inhibition of new transmissions pursuant to the protocol is ended, and the YES output of decision block 454 directs the logic to a block 458, which represents the transmission of ML subpackets (each with a header) contiguously into the sending end of the transmission path by way of modem 214 (FIG. 2). The logic then flows to a block 460, which represents the setting all bits VRTX(l) of the retransmission bit map to a logic high level (to a logic 1 level). A block 462 represents the setting of a round trip timer (included in block 242 of FIG. 2) to a time (TTO) equal to the round trip delay time plus the duration of the message (plus some small time increment $\Delta T$ to take account of timing errors, if desired). The logic then waits for an extrinsic event, as represented by block 464. Block 464 can be exited either by expiration of time out TTO, whereupon block 464 is exited via interrupt path 466, or by an enabled interrupt path 472 controlled from block 434 of FIG. 4a, whereupon interrupt path 472 is taken, and the logic arrives at a block 473 at a time near T82 (FIG. 3). Block 473 represents fetching the current retransmission bit map VRTX (l) from the logic of FIG. 4a in order to know which subpackets must be retransmitted.

In the event that its own transmitted message is not received at all as a result of collision or for any other reason, (i.e. exit from block 464 of FIG. 4b via TTO path) the logic must conclude that all the subpackets must be retransmitted on a random basis. Interrupt path 466 directs the logic to block 468 which represents preparation of all ML subpackets for retransmission. For example, transmitter-receiver E will have ML=2, and two subpackets will be retransmitted. The header need not be changed in this case, because the entire message packet including all subpackets must be retransmitted. From block 468, the logic proceeds to a block 470, representing a random delay having an average delay length of Tx. In general Tx is typically of the same order (0.1.-0.5 secs.) as Ta, but depends on the system load. As the system load increases, Tx also increases for optimum operation. After expiration of the delay the logic returns to decision block 454.

If at least one subpacket is successfully received as a result of contention transmissions, block 464 is exited at time T82 by interrupt path 472 and block 472, as mentioned, whereupon the logic reaches block 474, which represents the determination of the number of subpackets requiring retransmission, which is accomplished by simply counting the number of logic ones remaining in bit map VRTX(l). The number of subpackets requiring transmission is set equal to K. The logic then flows to decision block 476, in which K (the number of subpackets requiring retransmission) is evaluated. If all subpackets were successfully received, K=0, the logic flows from the YES output of decision block 476 by path 478 back to the idle state represented by block 450. If not all subpackets were successfully received, K will be greater than 0 and the NO output of decision block 476 directs the logic by a path 480 to a block 482, which represents the preparation of the subpackets which are to be retransmitted for transmission, their organization into a further message packet, and a change in the indicated number of subpackets in the message packet by changing value of ML in the headers. Block 484 represents the resetting of ML to equal K, the new message length. Block 486 represents the fetching of the retransmission delay RTXDEL calculated in block 434 of FIG. 4a, and delay by that amount. At the expiration of the delay, the logic returns to block 458 which represents retransmission of the ML subpackets.

Figure 5:
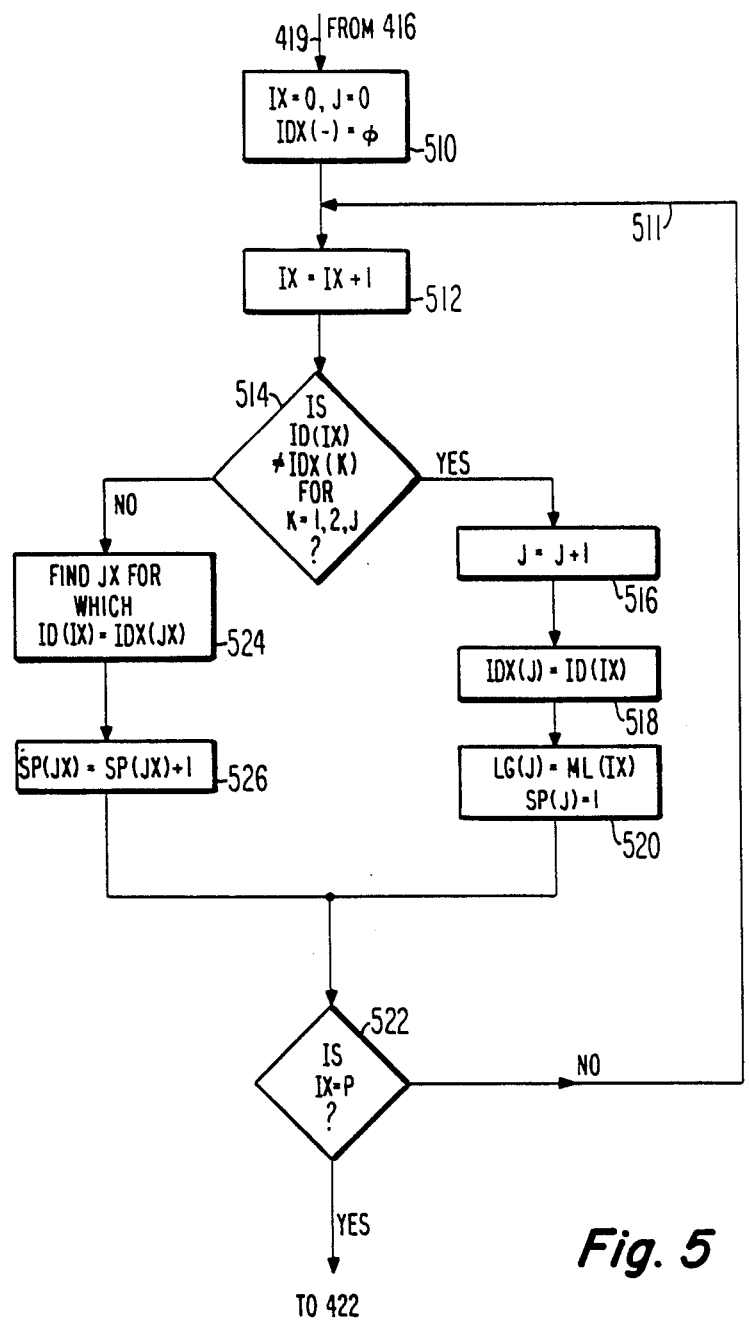

The logic of FIG. 5 represents the calculation of the distinct ID's received during the preceding asynchronous interval. The logic determines the total number IDM of distinct ID's successfully received, and for each distinct source ID creates a record of the form IDX(J) for the $J^{th}$ ID; and SP(J) representing the total number of successfully received subpackets with source ID equal to IDX(J); and LG(J) representing the total message length of the message which contained successfully received subpackets from source ID equal to IDX(J). For example, from FIG. 3, the following record would be prepared:

| J: | 1 | 2 | 3 | 4 | 5 |
|---|---|---|---|---|---|
| IDX(J): | A | B | C | D | F |
| SP(J): | 2 | 3 | 3 | 1 | 3 |
| LG(J) | 4 | 5 | 3 | 5 | 4 |

In the arrangement of FIG. 5, this is accomplished beginning with initialization block 510 in which two counters IX and J are set equal to zero, and all arrays are nulled (set equal to zero). The logic flows to block 512, which increments variable IX, which due to the logic loop including path 511 runs over all values of IX up to P, the total number of subpackets successfully received. The logic after each increment of variable IX flows from block 512 to a decision block 514, in which the currently observed subpackets' ID is compared with all recorded ID's (for the first iteration, no ID's have been recorded). If the ID is not already recorded, the logic leaves the decision block by the YES path, and reaches a block 516, which increments variable J, to begin the recording of the ID. In block 518, the ID corresponding to J is stored, after which the message length LG(J) is stored in a block 520, and SP(J), representing the number of successfully received subpackets so far identified, is incremented. The logic than flows to a further decision block 522, where the value of running variable IX is compared with P. The logic returns to block 512 by path 511 to continue evaluating successfully received subpackets until the $P^{th}$ subpacket is evaluated. If the successfully received subpacket's ID has already been stored, the logic exits from decision block 514 to a block 524. The index JX under which it is already stored is formed, and the "good" subpacket count SP(JX) for that index is incremented by one. The logic flows from block 526 to decision block 522. When all successfully received subpackets have been evaluated, decision block 522 directs the logic to block 422 (FIG. 4*a*).

Figure 6:
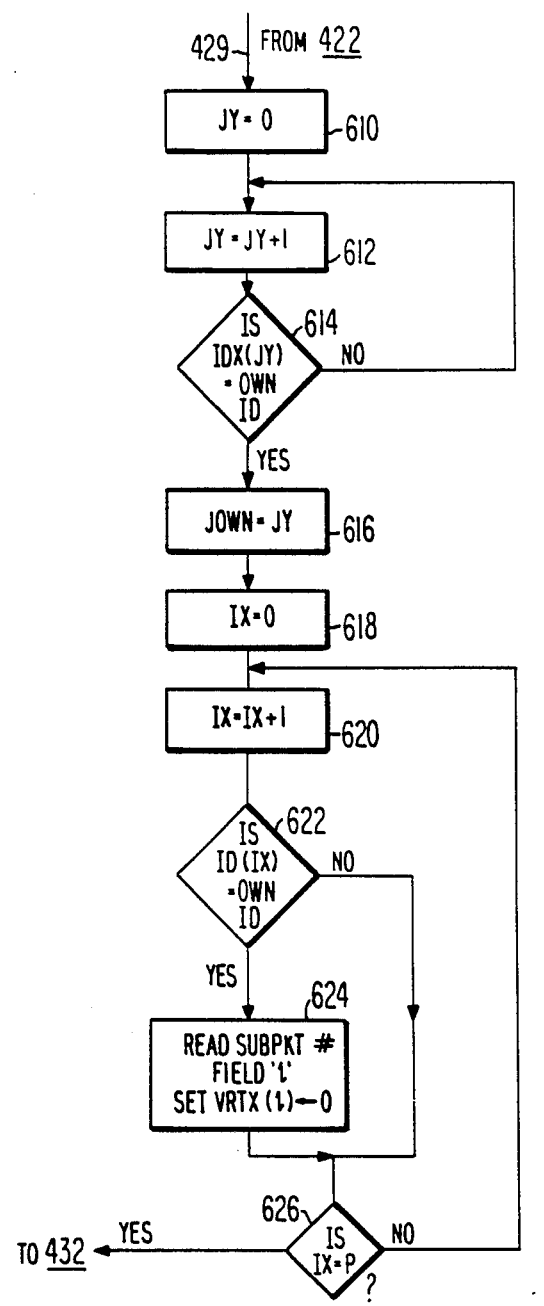

FIG. 6 represents the logic performed by block 431 of FIG. 4*a*. This logic is reached only if the transmitter-receiver successfully receives at least one of its own subpackets. The logic determines which J corresponds to the own packets. At block 610, a running variable JY is set equal to zero. The logic proceeds to a block 612, where JY is incremented. In decision block 614, the current value of IDX(JY) is compared with the own ID. If not the same, the logic takes the NO output and loops back to block 612. Eventually, that one IDX corresponding to the own ID will be reached, and decision block 614 directs the logic to a block 616. Block 616 sets variable JOWN equal to JY.

Block 618 sets a running variable IX equal to zero, preparatory for setting the retransmission bit map equal to zero for those positions corresponding to subpackets which were successfully received. Block 620 increments running variable IX. Decision block 622 compares the raw or unprocessed record ID with the own ID for each value of IX, and everytime there is a match the YES output directs the logic to a block 624, which represents the reading of the subpacket number, and the setting of the corresponding bit of the retransmission bit map to zero. The logic reaches a decision block 626, which causes repeated evaluation of all received subpackets up to the $P^{th}$ subpacket.

Other embodiments of the invention will be apparent to those skilled in the art. In particular, the one-subpacket-duration guard time between the end of the asynchronous interval (time T82) and the beginning of the retransmission interval (time T102) may be made equal to more than one subpacket duration, up to a maximum message length (which may be, for example, five subpackets durations), and the information from those subpackets successfully received in the interval may be utilized in order to increase the capacity.

What is claimed is:

1. A method for burst communication among a plurality of similar associated transmitter-receivers by way of a transmission path having a time delay between any transmitter and any receiver which is longer than the duration of an information packet, the method comprising the steps at each transmitter-receiver of:
   accepting at a source transmitter-receiver offered information to form accepted information which is to be transmitted to at least one destination transmitter-receiver;
   forming said accepted information into a plurality of sequential information subpackets, each of predetermined duration;
   determining the number of said information subpackets in said plurality of sequential information subpackets to produce a length-representative word;
   associating with each of said information subpackets of said plurality of sequential information subpackets control information comprising said length-representative word, and words representing the identities of said source and destination transmitter-receivers, to produce combined subpackets;
   selecting a random time during times in which said source transmitter-receiver is enabled for initiation of nonscheduled transmissions;
   transmitting at least one of said combined subpackets of said sequence of said combined subpackets into the sending end of said transmission path beginning at said random time to produce transmitted combined subpackets;
   receiving transmitted combined subpackets from the receiving end of said transmission path in the form of own combined subpackets originating from the same transmitter-receiver by which they are received, and other combined subpackets originating from transmitter-receivers other than the receiving transmitter-receiver;
   counting successfully received combined subpackets up to a predetermined number, and ending a nonscheduled operating interval of an operating cycle including a nonscheduled operating mode interval and a scheduled operating mode interval upon reaching said predetermined number of successfully received combined subpackets;
   enabling initiation of nonscheduled transmissions during each said nonscheduled operating mode interval;
   storing the identities of the source and destination transmitter-receivers, and the associated length-representative word of successfully received combined subpackets;
   for those successfully received combined subpackets from each particular source in which said length-representative word is greater than the number of combined subpackets successfully received from said particular source, calculating the number of said combined subpackets from said particular source which are not received to form a nonreceived number, and forming a continuous sum representative of the sum of all such nonreceived numbers;
   at each transmitter-receiver whose transmitted combined subpackets resulted in a combination of own combined subpackets which were successfully received and own combined subpackets which were not successfully received, retransmitting at least the data contained in those of its own combined subpackets which were not successfully received as a result of said transmitted combined subpackets, said retransmission beginning at a time following the beginning of said scheduled operating mode interval by a delay which is the sum of an integer multiple of said predetermined duration plus the product of said continuous sum multiplied by said predetermined duration.

2. A method according to claim 1 further comprising the step, at each transmitter-receiver, of:
   at a time following transmission of sequential combined subpackets which is in excess of said time delay of said transmission path, in the event that no said own combined subpackets are successfully received, selecting a new random time within the next following nonscheduled operating mode interval and transmitting said sequential combined subpackets beginning at said new random time.

3. A method according to claim 1 further comprising the step of inhibiting new nonscheduled transmissions during said scheduled operating mode interval, while allowing completion of nonscheduled transmissions initiated during the preceding nonscheduled operating mode interval.

4. A method according to claim 3 wherein said nonscheduled transmissions initiated during the preceding nonscheduled operating mode interval, the completion of which is allowed during said scheduled operating mode interval, have a duration equal to one said predetermined duration.

5. A method according to claim 3 wherein said nonscheduled transmissions initiated during the preceding nonscheduled operating mode interval, the completion of which is allowed during said scheduled operating mode interval, have a duration which is an integer multiple of said predetermined duration.

6. A method according to claim 1, wherein at least some of said transmitted combined subpackets which are transmitted in relation to said transmitting step during said nonscheduled mode operating interval are received in relation to said receiving step during said scheduled mode operating interval.

7. A method according to claim 1 wherein said storing step includes the step of storing said identities and said length representative word of said successfully received combined subpackets in order of successful reception.

8. A transmitter-receiver adapted for burst communication among a plurality of similar associated transmitter-receivers by way of a transmission path, comprising:
accepting means adapted to be coupled to a source of offered information for accepting offered information which is to be transmitted, thereby forming accepted information;
forming means coupled to said accepting means for forming said accepted information into a plurality of sequential information subpackets, each of predetermined duration;
determining means coupled to said forming means for determining the number of said information subpackets contained in said plurality of sequential information subpackets, to produce a length-representative word;
associating means coupled to said accepting means, said forming means and said determining means for associating control information with each of said information subpackets of said plurality of sequential information subpackets, said control information comprising said length-representative word, and words representing the identities of the source and destination transmitter-receivers, thereby producing combined subpackets;
random time selection means for selecting a random time during which said source transmitter-receiver is enabled for initiation of nonscheduled transmissions;
transmitting means coupled to said associating means and to said random time selection means and adapted to be coupled to said transmission path for transmitting at least one of said combined subpackets into said transmission path beginning at said random time to produce transmitted combined subpackets;
receiving means adapted to be coupled to said transmission path for receiving said transmitted combined subpackets in the form of own combined subpackets originating from the same transmitter-receiver by which they are received, and other combined subpackets originating from transmitter-receivers other than the receiving transmitter-receiver;
counting means coupled to said receiving means for counting successfully received combined subpackets up to a predetermined number, and for ending a nonscheduled operating interval of an operating cycle including a nonscheduled operating mode interval and a scheduled operating mode interval upon reaching said predetermined number of successfully received combined subpackets;
enabling means coupled to said counting means and to said random time selection means for enabling initiation of nonscheduled transmissions during each said nonscheduled operating mode interval;
storing means coupled to said receiving means for storing the identities of the source and destination transmitter-receivers, and the associated length-representative word of successfully received combined subpackets;
calculating means coupled to said storing means for calculating a nonreceived number representing the number of said combined subpackets which are not received from those particular source transmitter-receivers in which said length-representative word in a successfully received subpacket is greater than the number of combined subpackets successfully received, and for forming a continuous sum representative of the sum of all such nonreceived numbers; and
retransmission means coupled to said calculating means for retransmitting at least the data contained in those of its own combined subpackets which were not successfully received, said retransmission beginning at a time following the beginning of said scheduled operating mode interval by a delay which is the sum of an integer multiple of said predetermined duration plus the product of said continuous sum multiplied by said predetermined duration.

9. A transmitter-receiver according to claim 8, further comprising means for selecting a new random time within the next following nonscheduled operating mode interval in the event that no said own combined subpackets are successfully received as a result of transmission during a nonscheduled operating mode interval, and for transmitting said sequential combined subpackets beginning at said new random time.

10. A transmitter-receiver according to claim 8 further comprising inhibiting means coupled to said counting means for inhibiting new nonscheduled transmissions during said scheduled operating mode interval.

11. A transmitter-receiver according to claim 10, wherein said inhibiting means allows completion of during scheduled operating mode intervals of new transmissions initiated during a nonscheduled operating mode interval.

* * * * *